April 22, 1958   W. H. PHELPS   2,831,697
ADJUSTABLE AXLE MOUNTING FOR A ROTARY MOWER
Filed Sept. 28, 1955
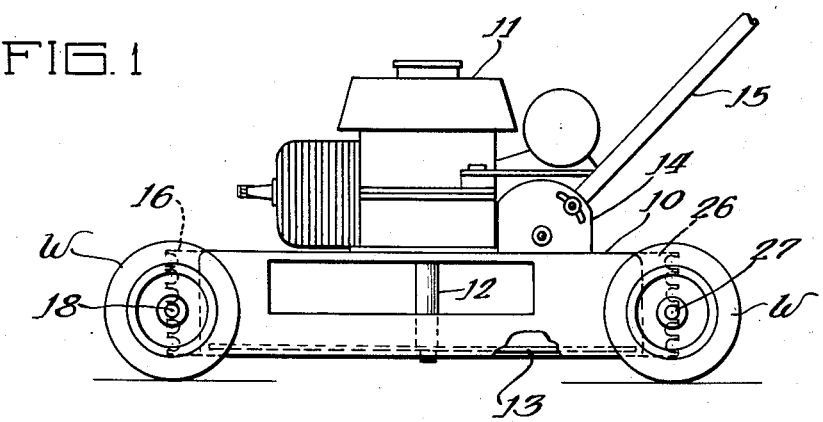
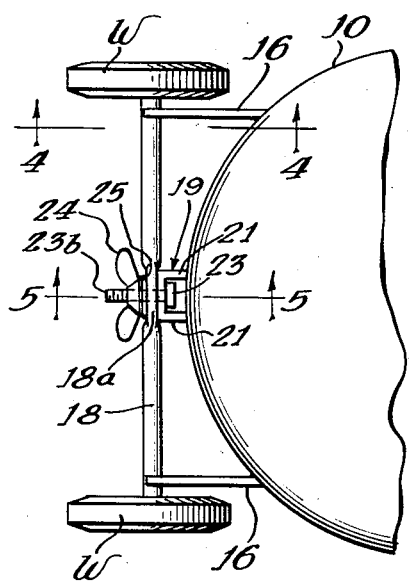
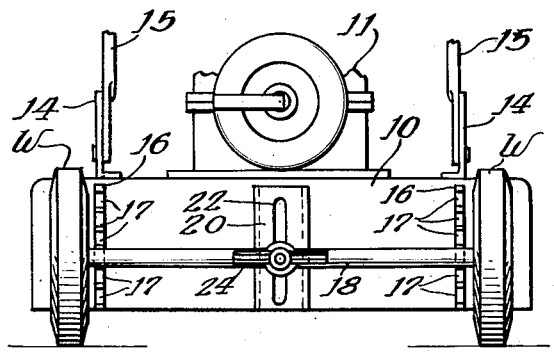
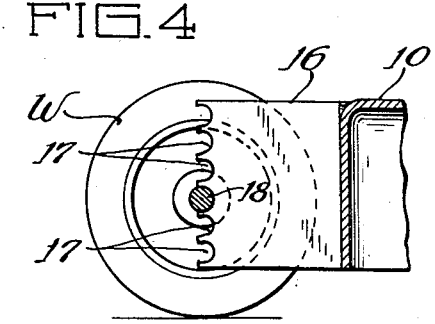
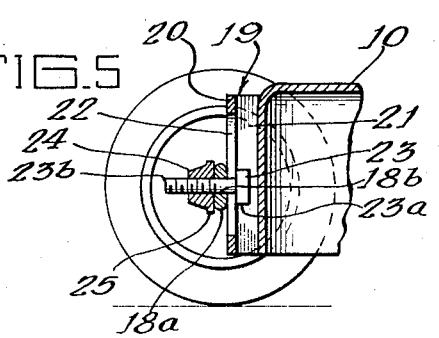
Inventor:
William H. Phelps
By Schroeder, Hofgren,
Brady & Wegner
Attorneys United States Patent Office 2,831,697
Patented Apr. 22, 1958

2,831,697
ADJUSTABLE AXLE MOUNTING FOR A ROTARY MOWER

William H. Phelps, Ralston, Nebr.

Application September 28, 1955, Serial No. 537,107

5 Claims. (Cl. 280—43)

This invention relates to a rotary mower, and in particular it relates to an improved axle mounting for such a mower.

The principal object of the invention is to provide a very simple and rapidly adjustable means for moving the wheels of a rotary power mower up and down so as to adjust the height of the mower cut.

A further object of the invention is to provide an adjustable axle construction which can be readily moved from one position to another by one person without the use of tools.

Yet another object of the invention is to provide a vertically adjustable axle structure which may be made from relatively light gauge sheet and rod stock in simple forming operations.

The invention is illustrated in a preferred embodiment in the accompanying drawings, in which:

Fig. 1 is a side elevational view of a mower equipped with the wheel mounting of the present invention;

Fig. 2 is a fragmentary plan view on an enlarged scale showing the wheel mounting;

Fig. 3 is a fragmentary front elevational view of the mower;

Fig. 4 is a fragmentary sectional view on an enlarged scale taken as indicated along the line 4—4 of Fig. 2; and Fig. 5 is a fragmentary sectional view on an enlarged scale taken as indicated along the line 5—5 of Fig. 2.

Referring to the drawings in greater detail, and referring first to Fig. 1, a rotary mower has a generally circular frame 10 on top of which is a motor 11 having a depending shaft 12 on the lower end of which is a mower blade 13. A pair of upright brackets 14 provide support for the inclined handle arms 15 of the mower.

As best seen in Figs. 2 to 4, at the front of the mower frame is a pair of longitudinally projecting, upright axle mounting brackets 16, while at the rear of the frame 10 is an identical pair of axle mounting brackets 26. As best seen in Figs. 3 and 4, each of the brackets 16 is provided with a series of vertically spaced notches 17 which are arranged in coplanar pairs on the two brackets. As seen in Fig. 4, each of the notches is slightly undercut, preferably at an angle about 12° from the horizontal, so that when an axle 18 is engaged in a pair of the coplanar notches 17 as seen in the drawing the weight of the frame 10 and motor bearing on the axle and wheels W tends to thrust the axle 18 into the backs of the notches 17.

At the center of the frame between the brackets 16 is an upright attaching member indicated generally at 19 which preferably takes the form of a channel member having a flat forward face 20 and attaching arms 21, there being an upright slot 22 in the flat face 20 so that the channel member may act as a slideway. As best seen in Figs. 2 and 5, the axle 18 is provided with a flattened central portion 18a which abuts against the flat forward face 20 of the channel member 19, and there is a hole 18b through the flat central portion of the axle to receive a bolt 23 which has its head 23a between the mounting arms 21 of the channel member 19 and its shank 23b extending through the slot 22 in the channel member and through the opening 18b in the flattened central portion of the axle 18. A wing nut 24 and washer 25 cooperate with the bolt 23 to form clamping means by which the central portion of the axle is adjustably secured to the front face 20 of the channel member 19.

As seen in Fig. 1, the rear of the mower is provided with axle mounting brackets 26 which are identical with the mounting brackets 16, and a rear axle 27 for rear wheels W is mounted in the brackets 26 in exactly the same manner as has been described for the front axle 18.

The present axle mounting provides a very simple means of adjusting the height of the frame 10 with respect to the wheels so as to adjust the height of cut of the mower. Using a wing nut 24, or other similar type of nut which may be readily turned without tools, it is possible for one person to adjust the height of cut merely by loosening the wing nut 24 enough to permit the axle to be swung out of the notches 17. One end of the axle may be swung out of the notch in which it is positioned and relocated at the desired height, and thereafter the other end of the axle may be relocated at the same height as is the first end of the axle. The wing nut 24 may then be tightened to again firmly fix the axle in position in the selected notches 17. The undercut notches serve two purposes. First, when the axle is being adjusted the weight of the frame 10 tends to force the axle into the backs of the notches 17 until the wing nut 24 can be tightened. Second, the undercut notches permit the use of a considerably lighter gauge rod stock for the axle 18 than is possible if the notches are not undercut. As the mower bumps over the ground in use an end of the axle can spring out of a notch 17 which is not undercut. It has been found that with the type of metal which it is desirable to use for the axle 18 the undercut notches permit the use of a ½ inch or ⅜ inch round rod, whereas if the notches are not undercut it is necessary to use at least ⅝ inch rod stock for the axle.

The foregoing detailed description is given for clearness of understanding only and no unnecessary limitations are to be understood therefrom, as some modifications will be obvious to those skilled in the art.

I claim:

1. In a rotary mower: a frame having a depending guard skirt; a pair of parallel upright axle mounting brackets secured to, and projecting longitudinally outward from said skirt, said brackets having a plurality of vertically spaced notches arranged in coplanar pairs, an upright attaching member on the skirt midway between said brackets; an axle outside said skirt the outer portions of which are adapted selectively to engage one or another of the coplanar pairs of notches in said brackets, said axle having wheels and clamping means for adjustably securing the central portion of the axle to said attaching member in alignment with the pair of notches engaged by the axle.

2. The device of claim 1 in which the attaching member comprises a channel member on the outside of the skirt with an upright slot, and the clamping means includes a bolt extending through said slot and engaged with the axle, and a nut screwed onto the bolt.

3. The device of claim 1 in which the attaching member has a flat outer face and the axle has a flat central portion abutting said outer face.

4. In a rotary mower: a frame; a pair of longitudinally projecting upright axle mounting brackets adjacent the two sides of said frame, said brackets having a plurality of vertically spaced undercut notches arranged in coplanar pairs; an upright slideway midway between the brackets, said slideway having a flat outer face; a straight axle which has a flattened central portion bearing against the flat face of the slideway, the end portions of said axle being adapted to selectively engage one or another of said pairs of notches in the brackets; and clamping means for adjustably securing the axle to the slideway.

5. In a rotary mower: a frame having a depending guard skirt; a pair of parallel upright axle mounting brackets secured to, and projecting longitudinally outward from the two sides of said frame, said brackets having a plurality of vertically spaced undercut notches arranged in coplanar pairs; an upright attaching member on the skirt midway between said brackets and generally coextensive with the notches on the brackets; an axle the outer portions of which are adapted selectively to engage one or another of the coplanar pairs of undercut notches in said brackets, said axle having wheels; and clamping means for adjustably securing the central portion of the axle to said attaching member in alignment with the pair of notches engaged by the axle.

References Cited in the file of this patent

UNITED STATES PATENTS

| | | |
|---|---|---|
| 1,331,501 | Heger | Feb. 24, 1920 |
| 2,728,582 | Knarzer | Dec. 27, 1955 |